(12) United States Patent
Fike et al.

(10) Patent No.: US 8,016,980 B2
(45) Date of Patent: Sep. 13, 2011

(54) PAPER PRODUCTS

(75) Inventors: Gregory Michael Fike, Appleton, WI (US); Joseph Robert Pounder, Greenville, WI (US)

(73) Assignee: Dixie Consumer Products LLC, Atlanta, GA (US)

( * ) Notice: Subject to any disclaimer, the term of this patent is extended or adjusted under 35 U.S.C. 154(b) by 422 days.

(21) Appl. No.: 12/277,577

(22) Filed: Nov. 25, 2008

(65) Prior Publication Data

US 2010/0126685 A1    May 27, 2010

(51) Int. Cl.
*D21H 11/00* (2006.01)
(52) U.S. Cl. .................................................. 162/164.7
(58) Field of Classification Search ............... 162/164.7, 162/168.1
See application file for complete search history.

(56) References Cited

U.S. PATENT DOCUMENTS

| | | |
|---|---|---|
| 4,820,749 A | 4/1989 | Beshay |
| 5,026,745 A | 6/1991 | Weil |
| 5,059,642 A | 10/1991 | Jane |
| 5,076,983 A | 12/1991 | Loomis et al. |
| 5,087,650 A | 2/1992 | Willett |
| 5,095,054 A | 3/1992 | Lay et al. |
| 5,134,171 A | 7/1992 | Hammel et al. |
| 5,171,820 A | 12/1992 | Mang et al. |
| 5,180,765 A | 1/1993 | Sinclair |
| 5,210,108 A | 5/1993 | Spinu et al. |
| 5,216,050 A | 6/1993 | Sinclair |
| 5,252,642 A | 10/1993 | Sinclair et al. |
| 5,292,782 A | 3/1994 | Bastioli et al. |
| 5,296,282 A | 3/1994 | Evers |
| 5,300,358 A | 4/1994 | Evers |
| 5,314,934 A | 5/1994 | Tomka |
| 5,321,064 A | 6/1994 | Vaidya et al. |
| 5,346,936 A | 9/1994 | Buehler et al. |
| 5,412,005 A | 5/1995 | Bastioli et al. |
| 5,424,346 A | 6/1995 | Sinclair |
| 5,444,113 A | 8/1995 | Sinclair et al. |
| 5,475,080 A | 12/1995 | Gruber et al. |
| 5,484,881 A | 1/1996 | Gruber et al. |
| 5,496,895 A | 3/1996 | Chinnaswamy et al. |
| 5,496,910 A | 3/1996 | Mang et al. |
| 5,500,465 A | 3/1996 | Krishnan et al. |
| 5,502,158 A | 3/1996 | Sinclair et al. |
| 5,510,401 A | 4/1996 | Dehennau et al. |
| 5,536,807 A | 7/1996 | Gruber et al. |
| 5,556,895 A | 9/1996 | Lipinsky et al. |
| 5,585,191 A | 12/1996 | Gruber et al. |

(Continued)

FOREIGN PATENT DOCUMENTS

CA    2557705 A1    9/2005

(Continued)

OTHER PUBLICATIONS

R. Chinnaswamy et al., Extrusion-Grafting Starch Onto Vinylic Polymers, 1991, pp. 396-402, vol. 43, issue 10, Verlagsgesellschaft mbH, Weinheim, Germany.

(Continued)

*Primary Examiner* — Mark Halpern
(74) *Attorney, Agent, or Firm* — William W. Letson

(57) ABSTRACT

A paper product includes a paperboard comprising a substrate layer, a filler layer, and a cap layer, wherein the filler layer is disposed between the substrate layer and the cap layer, wherein the filler layer includes a filler material, wherein the cap layer includes a polylactic acid based resin, and wherein the cap layer is substantially free of filler material.

20 Claims, 1 Drawing Sheet

U.S. PATENT DOCUMENTS

| | | | |
|---|---|---|---|
| 5,627,223 A | 5/1997 | Dehennau | |
| 5,635,550 A | 6/1997 | Dehennau et al. | |
| 5,639,466 A | 6/1997 | Ford et al. | |
| 5,665,474 A | 9/1997 | Gruber et al. | |
| 5,679,421 A | 10/1997 | Brinton, Jr. | |
| 5,760,118 A | 6/1998 | Sinclair et al. | |
| 5,767,222 A | 6/1998 | Lipinsky et al. | |
| 5,773,562 A | 6/1998 | Gruber et al. | |
| 5,798,436 A | 8/1998 | Gruber et al. | |
| 5,801,223 A | 9/1998 | Lipinsky et al. | |
| 5,830,548 A | 11/1998 | Andersen et al. | |
| 5,834,582 A | 11/1998 | Sinclair et al. | |
| 5,849,374 A | 12/1998 | Gruber et al. | |
| 5,849,401 A | 12/1998 | El-Afandi et al. | |
| 5,852,166 A | 12/1998 | Gruber et al. | |
| 5,874,486 A | 2/1999 | Bastioli et al. | |
| 5,883,199 A | 3/1999 | McCarthy et al. | |
| 5,908,918 A | 6/1999 | Chen et al. | |
| 5,914,381 A | 6/1999 | Terado et al. | |
| 5,916,950 A | 6/1999 | Obuchi et al. | |
| 5,932,641 A | 8/1999 | Blanchard et al. | |
| 6,005,068 A | 12/1999 | Gruber et al. | |
| 6,025,458 A | 2/2000 | Lipinsky et al. | |
| 6,027,677 A | 2/2000 | Ostapchenko et al. | |
| 6,080,478 A | 6/2000 | Karhuketo | |
| 6,093,791 A | 7/2000 | Gruber et al. | |
| 6,121,410 A | 9/2000 | Gruber et al. | |
| 6,183,814 B1 | 2/2001 | Nangeroni et al. | |
| 6,184,261 B1 | 2/2001 | Biby et al. | |
| 6,191,196 B1 | 2/2001 | Willett et al. | |
| 6,197,380 B1 | 3/2001 | Gruber et al. | |
| 6,207,792 B1 | 3/2001 | Gruber et al. | |
| 6,218,321 B1 | 4/2001 | Lorcks et al. | |
| 6,235,815 B1 | 5/2001 | Loercks et al. | |
| 6,277,899 B1 | 8/2001 | Bastioli et al. | |
| 6,312,823 B1 | 11/2001 | El-Afandi et al. | |
| 6,323,307 B1 | 11/2001 | Bigg et al. | |
| 6,362,256 B2 | 3/2002 | Willett et al. | |
| 6,472,497 B2 | 10/2002 | Loercks et al. | |
| 6,573,340 B1 | 6/2003 | Khemani et al. | |
| 6,623,854 B2 | 9/2003 | Bond | |
| 6,632,862 B2 | 10/2003 | Willett et al. | |
| 6,645,584 B1 | 11/2003 | Kuusipalo et al. | |
| 6,787,613 B2 | 9/2004 | Bastioli et al. | |
| 6,818,295 B2 | 11/2004 | Bond et al. | |
| 6,841,597 B2 | 1/2005 | Bastioli et al. | |
| 6,962,950 B1 | 11/2005 | Bastioli et al. | |
| 7,037,959 B1 | 5/2006 | Willett et al. | |
| 7,067,596 B2 | 6/2006 | Bastioli et al. | |
| 7,071,249 B2 | 7/2006 | Ho et al. | |
| 7,098,298 B2 | 8/2006 | Kinoshita et al. | |
| 7,118,897 B2 | 10/2006 | Narasimhan et al. | |
| 7,138,439 B2 | 11/2006 | Scheer et al. | |
| 7,144,972 B2 | 12/2006 | Hayes | |
| 7,153,928 B2 | 12/2006 | Kinoshita et al. | |
| 7,160,977 B2 | 1/2007 | Hale et al. | |
| 7,172,814 B2 | 2/2007 | Hodson | |
| 7,214,414 B2 | 5/2007 | Khemani et al. | |
| 7,226,765 B2 | 6/2007 | Narasimhan et al. | |
| 7,241,832 B2 | 7/2007 | Khemani et al. | |
| 7,297,394 B2 | 11/2007 | Khemani et al. | |
| 7,344,784 B2 | 3/2008 | Hodson | |
| 7,348,052 B2 | 3/2008 | Mueller et al. | |
| 7,364,774 B2 | 4/2008 | Urscheler et al. | |
| 7,368,511 B2 | 5/2008 | Hale et al. | |
| 7,378,266 B2 | 5/2008 | Narasimhan et al. | |
| 7,393,590 B2 | 7/2008 | Scheer et al. | |
| 2002/0127358 A1 | 9/2002 | Berlin et al. | |
| 2003/0039775 A1 | 2/2003 | Kong | |
| 2004/0034128 A1 | 2/2004 | Tokiwa et al. | |
| 2004/0043168 A1 | 3/2004 | Ishikawa et al. | |
| 2004/0092672 A1 | 5/2004 | Bastioli et al. | |
| 2004/0115424 A1 | 6/2004 | Cowton | |
| 2004/0121079 A1 | 6/2004 | Urscheler et al. | |
| 2004/0143072 A1 | 7/2004 | Lewis et al. | |
| 2004/0247752 A1 | 12/2004 | Koenig et al. | |
| 2004/0248486 A1 | 12/2004 | Hodson | |
| 2005/0054813 A1 | 3/2005 | Bastioli et al. | |
| 2005/0090625 A1 | 4/2005 | Bastioli et al. | |
| 2005/0171249 A1 | 8/2005 | Wang et al. | |
| 2005/0192377 A1 | 9/2005 | Scheer et al. | |
| 2005/0192410 A1 | 9/2005 | Scheer et al. | |
| 2005/0239998 A1 | 10/2005 | Kinoshita et al. | |
| 2006/0027941 A1 | 2/2006 | Woerdeman | |
| 2006/0148936 A1 | 7/2006 | Willett et al. | |
| 2006/0194010 A1 | 8/2006 | Hiscock | |
| 2006/0194902 A1 | 8/2006 | Nie et al. | |
| 2006/0241287 A1 | 10/2006 | Hecht et al. | |
| 2007/0129467 A1 | 6/2007 | Scheer | |
| 2007/0184220 A1 | 8/2007 | Cleveland et al. | |
| 2007/0203273 A1 | 8/2007 | Tao et al. | |
| 2007/0203283 A1 | 8/2007 | Scheer | |
| 2007/0203291 A1 | 8/2007 | Bastioli et al. | |
| 2007/0218275 A1 | 9/2007 | Parris et al. | |
| 2007/0243374 A1 | 10/2007 | Lewis et al. | |
| 2007/0259195 A1 | 11/2007 | Chou et al. | |
| 2008/0033093 A1 | 2/2008 | Menceloglu et al. | |
| 2008/0113887 A1 | 5/2008 | Scheer et al. | |
| 2008/0153940 A1 | 6/2008 | Scheer et al. | |

FOREIGN PATENT DOCUMENTS

| | | |
|---|---|---|
| CN | 1922270 A | 2/2005 |
| CN | 1950448 A | 4/2005 |
| EP | 1375592 | 1/2004 |
| EP | 1946922 A1 | 7/2008 |
| WO | 92/15485 A1 | 9/1992 |
| WO | 92/19680 A1 | 11/1992 |
| WO | 98/53141 A1 | 11/1998 |
| WO | 2005/085350 A1 | 9/2005 |
| WO | 2005/085351 A1 | 9/2005 |
| WO | 2007/063361 | 6/2007 |
| WO | 2007/099427 | 9/2007 |

OTHER PUBLICATIONS

International Search Report and Written Opinion of the International Search Authority of PCT/US2009/065497 mailed Mar. 3, 2010.

PAPER PRODUCTS

BACKGROUND

The present disclosure generally relates to paper products, and more particularly, to paper products comprising polylactic acid.

Paper, paperboard and other fibrous sheets made from natural cellulose-based fibers are biodegradable. However, fibrous sheets tend to be porous. As a result, they do not provide good barriers against liquids. When fibrous sheets are used in applications where they will be exposed to liquids, they must generally be treated with a liquid-resistant material, such as paraffin wax or plastic. By doing so, however, the fibrous sheets are no longer biodegradable, but are as resistant to degradation as plastic or paraffin wax.

Recently, due to increased environmental awareness, much attention has been directed toward polymers such as polylactic acid (PLA) that are biodegradable. Polylactic acid is a thermoplastic, aliphatic polyester derived from renewable resources, such as corn starch or sugarcanes.

The use of polylactic acid in paper products, however, has been limited due to at least the cost disadvantages of polylactic acid. In general, the cost of polylactic acid is double that of petroleum based materials. To compound matters, polylactic acid has a higher density than petroleum based materials, which requires the use of more polylactic acid per pound as compared to petroleum based materials. Due to at least these complicating factors, polylactic acid has not readily been adopted for use in paper products.

Accordingly, a continual need exists for improvements in the use of polylactic acid with paper products.

BRIEF SUMMARY

Disclosed herein are paper products.

In one embodiment, a paper product comprises a paperboard comprising a substrate layer, a filler layer, and a cap layer, wherein the filler layer is disposed between the substrate layer and the cap layer, wherein the filler layer includes a filler material, wherein the cap layer includes a polylactic acid based resin, and wherein the cap layer is substantially free of filler material.

In one embodiment, a paper product comprises a paperboard comprising a substrate layer, a first filler layer, a second filler layer, a first cap layer, a second cap layer, wherein the substrate layer is disposed between the first filler layer and the second filler layer, wherein the first filler layer is disposed between the first cap layer and the substrate layer, wherein the second filler layer is disposed between the second cap layer and the substrate layer, wherein each of the first filler layer and the second filler layer includes a first filler material, wherein the first cap layer and the second cap layer includes a polylactic acid based resin, and wherein each of the first cap layer and the second cap layer is substantially free of filler material.

In one embodiment, a paper product, comprises a paperboard comprising a substrate layer, a filler layer, and a cap layer, wherein the filler layer is disposed between the substrate layer and the cap layer, wherein the filler layer includes a filler material, wherein the cap layer includes a polyester material selected from the group consisting of: polycaprolactone (PCL), polyvalerolactone (PVL), poly(lactide-co-glycolide) (PLGA), polybutyrolactone (PBL), polyglycolide, and polypropiolactone (PPL) poly(butylene terephthalate) (PBT), polybutylene adipate terephthalate (PBAT), poly butanediol adipic acid (PBA), polylactic acid (PLA), and combinations thereof, and wherein the cap layer is substantially free of filler material.

The above described and other features are exemplified by the following Figures and detailed description.

BRIEF DESCRIPTION OF THE DRAWINGS

Referring to the exemplary drawings wherein like elements are numbered alike in the several Figures.

DETAILED DESCRIPTION

Figure 1:
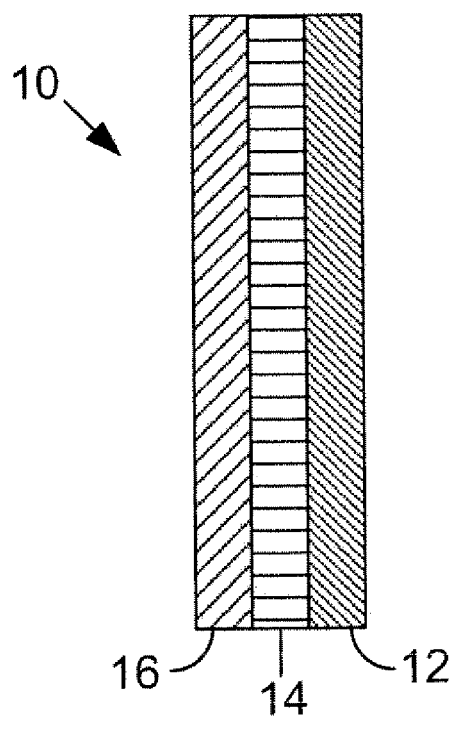
FIG. 1 illustrates a cross-section of an embodiment of a single-sided paper product.

Disclosed herein are paper products and methods of making paper products. It is to be understood that this disclosure is not limited to particular embodiments described, as such may, of course, vary. It is also to be understood that the terminology used herein is for the purpose of describing particular embodiments only, and is not intended to be limiting, since the scope of the present disclosure will be limited only by the appended claims.

As will be apparent to those of skill in the art upon reading this disclosure, each of the individual embodiments described and illustrated herein has discrete components and features which may be readily separated from or combined with the features of any of the other several embodiments without departing from the scope or spirit of the present disclosure. Any recited method can be carried out in the order of events recited or in any other order that is logically possible.

The term "paper product" refers to a structure that includes single-sided and double-sided paperboard structures. A paper product can include, but is not limited to, paper cups, hot cups, cold cups, food wraps or sleeves (e.g., a French Fry sleeve, wrap or tray, a hamburger wrap, a sandwich wrap, and the like), hamburger or sandwich clamshell containers, food buckets, folding cartons or containers, paper plates, take-out containers, paper bowls, blister packaging, and paper products having heat seal applications.

The term "single-sided" refers to a paperboard that has a substrate exposed (open to air or the outside of the paper product) on one side and a cap layer exposed (open to air or a food product or the inside of the paper product) on the opposite side of the paperboard. For example, a paper product that may include a single-sided paperboard include, but is not limited to, hot cups, food wraps or sleeves, and paper products having heat seal applications, where the cap layer contacts the food product.

The term "double-sided" refers to a paperboard that has a substrate that is not exposed (open to air). A cap layer disposed on either side of the substrate is exposed (open to air or a food product). For example, a paper product that may include a double-sided paperboard includes, but is not limited to, cold cups, and folding cartons.

The term "food product" refers to a liquid, solid, cream, or other consistency food item. For example, the food product can include a hot or cold beverage, a sandwich, a hamburger or equivalent sandwich, a potato product (e.g., French Fry, hash browns, tater tots, and the like), popcorn, a taco or a burrito, and a frozen product (e.g., fish, chicken nuggets, and the like).

The term "substantially free" refers to less than 10 weight percent of a component, specifically less than 5 weight percent, and even more specifically less than 1 weight percent.

The term "substrate" refers to part of the paperboard made from papermaking fibers (e.g., cellulose fibers) that are suitable for use in the paper products of the present disclosure. The papermaking fibers can include fibers obtained from softwood, hardwood, chemical pulp obtained from softwood and/or hardwood chips liberated into fiber by sulfate, sulfite, sulfide or other chemical pulping processes, mechanical pulp, recycled fibers, refined fibers, and the like. The fibers can be also be obtained from sources such as sabai grass, rice straw, banana leaves, paper mulberry (i.e., bast fiber), abaca leaves, pineapple leaves, esparto grass leaves, and fibers from the genus *Hesperaloe* in the family Agavaceae, and the like. In an embodiment, the papermaking fibers can be obtained from one or more of the sources noted above.

Papermaking fibers can be liberated from their source material by any one of the number of chemical pulping processes (e.g., sulfate, sulfite, polysulfite, soda pulping, and the like), mechanical and/or chemical pulping processes familiar (e.g., mechanical pulping, thermomechanical pulping, chemi-thermomechanical pulping, and the like).

Embodiments of the present disclosure provide for paper products, methods of making paper products, and the like. Embodiments of the present disclosure include paper products that include a paperboard. The paperboard can be single-sided or double-sided. Embodiments of the paperboard include at least one filler layer and at least one cap layer, where the cap layer is exposed to the food product in the paper product. The cap layer includes a polylactic acid based resin without any filler material. The filler layer includes a polylactic acid based resin with a filler material.

Embodiments of the present disclosure are advantageous for at least the reason that the paperboard includes less polylactic acid based resin since a filler material is used in conjunction with the polylactic acid based resin in the filler layer. As a result, the cost associated with paper product is reduced relative to that of a paper product not including a filler layer. In addition, using the polylactic acid based resin without the filler material in the cap layer improves barrier sealing, heat sealing, and/or the staining properties of the paper product. Further, embodiments of the present disclosure provide a coated paper board that is biodegradable.

In an embodiment, the paper product includes a paperboard that includes a substrate layer, a filler layer, and a cap layer. The filler layer is disposed between the substrate layer and the cap layer. The substrate layer is positioned adjacent (next to) a first side of the filler layer and is in contact with the first side of the filler layer. The filler layer is positioned so that a second side of the filler layer is adjacent the cap layer and in contact with the cap layer. The substrate layer can be made of papermaking fibers as noted above. The substrate can have a thickness of about 5 to 300 pounds (lbs) per ream (rm).

FIG. 1 illustrates an embodiment of a cross-section of a portion of a paper product 10. The paper product 10 includes paperboard having the following layers: a substrate 12, a filler layer 14, and a cap layer 16. In an embodiment, the cap layer 16 is in contact with the food product.

The dimensions (e.g., thickness) substrate layer, the filler layer, the cap layer, and combinations thereof can vary depending on the food product. Table 1 provides illustrative ranges (broader to narrower ranges for one or more embodiments) of the layers for various food products. It should be understood that the layers can be used in food products not noted below, and the dimensions for such layers will be appropriate for the food product.

TABLE 1

| Product | Substrate layer ranges (lb (#)/ream) | Filler layer ranges (#/ream) | Cap layer ranges (#/ream) | Combined (cap + filler layer) ranges (#/ream) |
|---|---|---|---|---|
| Foodwrap | 5-40, 8-30, 10-25 | 1-15, 2-12, 2-8 | 1-15, 1-5, 2-5 | 2-25, 3-20, 4-10 |
| Cups | 60-240, 90-200, 90-200 | 1-24, 1-20, 5-15 | 1-24, 1-20, 2-5 | 5-30, 7-25, 7-20 |
| Plates | 70-280, 80-240, 90-220 | 1-24, 1-20, 5-15 | 1-24, 1-20, 2-5 | 5-30, 7-25, 7-20 |
| Folding Cartons | 60-240, 90-200, 90-200 | 1-24, 1-20, 5-15 | 1-24, 1-20, 2-5 | 5-30, 7-25, 7-20 |
| Food Containers | 60-240, 90-200, 90-200 | 1-24, 1-20, 5-15 | 1-24, 1-20, 2-5 | 5-30, 7-25, 7-20 |

In another embodiment, the paper product includes a paperboard comprising a substrate layer, a first filler layer, a second filler layer, a first cap layer, a second cap layer. The substrate layer is disposed between the first filler layer and the second filler layer. The first filler layer is disposed between the first cap layer and the substrate layer. The second filler layer is disposed between the second cap layer and the substrate.

A first side of the substrate layer is positioned adjacent (next to) a first side of the first filler layer and is in contact with the first side of the first filler layer. The first filler layer is positioned so that a second side of the first filler layer is adjacent the first cap layer and in contact with the first cap layer.

A second side of the substrate layer is positioned adjacent (next to) a first side of the second filler layer and is in contact with the second side of the first filler layer. The second filler layer is positioned so that a second side of the second filler layer is adjacent the second cap layer and in contact with the second cap layer.

Figure 2:
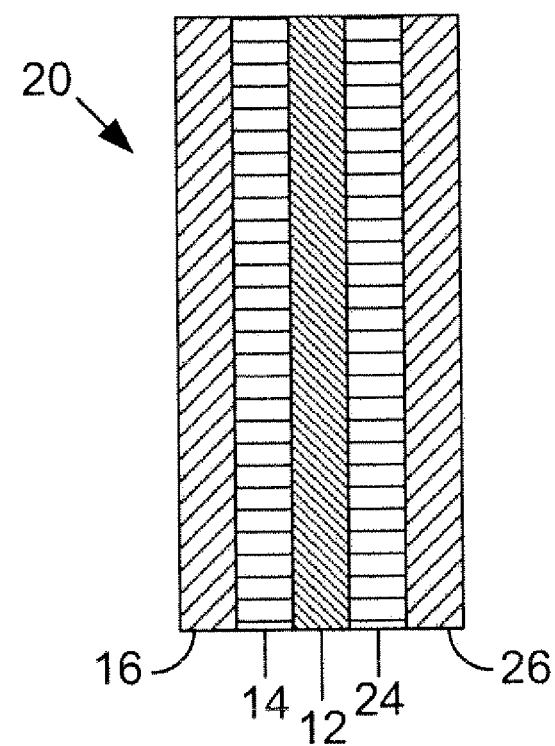
FIG. 2 illustrates a cross-section of an embodiment of a double-sided paper product.

FIG. 2 illustrates an embodiment of a double-sided paper product 20. The paper product 20 includes paperboard having the following layers: a substrate layer 12, a first filler layer 14, a second filler layer 24, a first cap layer 16, a second cap layer 26. Either or both of the first cap layer 16 and the second cap layer 26 can be in contact with a food product.

The dimensions (e.g., thickness) substrate layer, the first and the second filler layers, the first and the second cap layers, and combinations thereof can vary depending on the food product. Table 1 above provides illustrative ranges (broader to narrower ranges for one or more embodiments) of the layers for various food products. It should be understood that the layers can be used in food products not noted below, and the dimensions for such layers will be appropriate for the food product. Also, last column of Table 1 corresponds to the combination (combined thickness) of the cap layer and the filler layer. In regard to the embodiment described in FIG. 2, the last column of Table 1 corresponds to the thickness (combined thickness) of first cap layer and the first filler layer, and also corresponds (combined thickness) to the thickness of the second cap layer and the second filler layer.

In each embodiment, the cap layer (or first or second cap layer) includes a polylactic acid based resin and does not include a filler material. The polylactic acid based resin includes polylactic acid (also referred to as "polylactide" or "poly(lactic acid)"). The polylactic acid can include the L-lactic acid and/or D-lactic acid forms of polylactic acid as well as components derived from lactic acid. In an embodiment, the polylactic acid is a polymer, a copolymer, or a terpolymer, based on polylactic acid. Embodiments of the polylactic acid based resin are not limited by the method of making the polylactic acid based resin or the polylactic acid.

In an embodiment, the polylactic acid based resin includes a polymer, a copolymer, or a terpolymer, based on polylactic acid, where the resin includes greater than about 50 weight percent polylactic acid, greater than about 60 weight percent polylactic acid, greater than about 70 weight percent polylactic acid, greater than about 80 weight percent polylactic acid, greater than about 90 weight percent polylactic acid, or greater than about 95 weight percent polylactic acid.

In an embodiment, the polylactic acid can have a molecular weight from about 2 to 500,000. In an embodiment, the polylactic acid can have a molecular weight from about 10,000 to 500,000. In an embodiment, the polylactic acid can have a molecular weight from about 50,000 to 500,000. In an embodiment, the polylactic acid can have a molecular weight from about 100,000 to 500,000. In an embodiment, the polylactic acid can have a molecular weight from about 200,000 to 500,000. In an embodiment, the polylactic acid can have a molecular weight from about 250,000 to 500,000. In an embodiment, the polylactic acid can have a molecular weight from about 10,000 to 250,000. In an embodiment, the polylactic acid can have a molecular weight from about 10,000 to 200,000. In an embodiment, the polylactic acid can have a molecular weight from about 10,000 to 100,000. In an embodiment, the polylactic acid can have a molecular weight from about 50,000 to 250,000. In an embodiment, the polylactic acid can have a molecular weight from about 50,000 to 200,000. In an embodiment, the polylactic acid can have a molecular weight from about 50,000 to 100,000.

In an embodiment, the polylactic acid can have a melting point of about 160 to 210° C. (degrees Celsius).

In an embodiment, the polylactic acid can have a have a glass transition temperature of 50 to 80° C.

In an embodiment, the polylactic acid prior to processing has a Melt Index of greater than 1 to about 10.

In an embodiment, the cap layer can include other polyester polymers such as, but not limited to, polycaprolactone (PCL), polyvalerolactone (PVL), poly(lactide-co-glycolide) (PLGA), polybutyrolactone (PBL), polyglycolide, polypropiolactone (PPL), poly(butylene terephthalate) (PBT), polybutylene adipate terephthalate (PBAT) (Ecoflex™, made by BASF), poly butanediol adipic acid (PBA), and combinations thereof. In an embodiment, the other polyester can be PBA, PBT, PCL, and combinations thereof. In one embodiment, the polyester polymers are biodegradable.

In an embodiment, the polylactic acid based resin can be about 5 to 40 percent weight of the cap layer. In an embodiment, the other polyester polymers can be about 5 to 60 percent weight of the cap layer. In another embodiment, the polylactic acid based resin can be about 80 to 100 percent weight of the cap layer. In an embodiment, the other polyester polymers, if present, can be about 10 to 20 percent weight of the cap layer.

In another embodiment, the polylactic acid based resin can be about 80 to 90 percent weight of the cap layer. In an embodiment, the other polyester polymers can be about 10 to 20 percent weight of the cap layer.

In another embodiment, the polylactic acid based resin can be about 82 to 88 percent weight of the cap layer. In an embodiment, the other polyester polymers can be about 12 to 18 percent weight of the cap layer.

In each embodiment, the filler layer (or first and second filler layers) includes a filler material. The filler material can include, but is not limited to, calcium carbonate, $TiO_2$, $BaSO_4$, clay, kaolin, silica, Mg—Al-silicate, styrene-based resin, acrylic resin, styrene-acrylic copolymer resin, vinyl chloride, polycarbonate, mica, sodium carbonate, potassium carbonate, barium carbonate, sodium silicate, sodium borosilicate, magnesium oxide, strontium oxide, barium oxide, zeolites, silicon dioxide, magnesium oxide, calcium oxide, barium oxide and combinations thereof The filler materials can have a range of a particle diameters dimensions and shapes. In an embodiment, calcium carbonate is ground and has an average diameter of about 1 micron. It should be noted that the dimensions and shapes can vary depending, at least in part, on the filler material, food product, and use of the food product. In an embodiment, the filler layer can include a polylactic acid based resin such as those described above in reference to the cap layer. In an embodiment, the polylactic acid based resin in the filler layer is the same as the polylactic acid based resin in the cap layer.

In an embodiment, the filler layer can include other polyester polymers such as those described above in reference to the cap layer. In an embodiment, the other polyester polymers in the filler layer are the same as the other polymers in the cap layer.

In an embodiment, the filler layer can include a polylactic acid based resin and other polyester polymers, such as those described above in reference to the cap layer. In an embodiment, the polylactic acid based resin and the other polyester polymers in the filler layer are the same as the polylactic acid based resin and the other polyester polymers in the cap layer.

In an embodiment, the filler material can be about 5 to 30 percent weight of the filler layer. In an embodiment, the polylactic acid based resin can be about 30 to 80 percent weight of the filler layer. In an embodiment, the other polyester polymers can be about 2 to 30 percent weight of the filler layer.

In an embodiment, the filler material can be about 15 to 25 percent weight of the filler layer. In an embodiment, the polylactic acid based resin can be about 55 to 80 percent weight of the filler layer. In an embodiment, the other polyester polymers can be about 5 to 20 percent weight of the filler layer.

In an embodiment, the filler material can be about 20 to 25 percent weight of the filler layer. In an embodiment, the polylactic acid based resin can be about 63 to 74 percent weight of the filler layer. In an embodiment, the other polyester polymers can be about 6 to 12 percent weight of the filler layer.

In an embodiment, the filler layer includes each of the filler material, the polylactic acid based resin, and the other polyester polymers in any combination of the ranges noted above.

In an embodiment, the filler layer and the cap layer can be formed using methods known in the art. In an embodiment, the filler layer can be formed using polymer extrusion techniques by disposing the filler layer materials onto the substrate. Unlike other processes using polylactic acid, the substrate does not need to be heated prior to disposing the filler layer onto the substrate. The heating of the substrate in other processes is done to increase adhesion of the polymer to the substrate. In contrast, embodiments of the filler layer have enhanced adhesion, which appears to be due to the inclusion of the filler material. This process can be performed one or more times to form the appropriate thickness of the layer. Then, the cap layer materials can be disposed onto the filler layer. This process can be performed one or more times to form the appropriate thickness of the layer. Thus, having the cap layer made of polylactic acid base resin and some other polyesters, the paper product has enhanced staining properties. Similar processes can be used to form the double-sided paperboard.

In an embodiment, the layers of the food product can be produced using coextrusion processes. In an embodiment, the coextrusion process includes combining the filler layer and the cap layer prior to bringing into contact with the substrate and cooling of the polymer melt with the chill roll.

EXAMPLES

Now having described the embodiments of the present disclosure, in general, the following Examples describe some additional embodiments of the present disclosure. While embodiments of the present disclosure are described in connection with the following examples and the corresponding text and figures, there is no intent to limit embodiments of the present disclosure to this description. On the contrary, the intent is to cover all alternatives, modifications, and equivalents included within the spirit and scope of embodiments of the present disclosure.

Efforts have been made to ensure accuracy with respect to numbers (e.g., amounts, temperature, etc.), but some errors and deviations should be accounted for.

The ability of a material to resist staining can be tested by exposing the material to an environmental stimulus and measuring the change in color that occurs between an unexposed sample and the exposed sample. The color changes are commonly measured using the L*a*b* scale. L* measures the whiteness of the material on a scale of 0-100 with 0 being black and 100 being perfectly white. a* measures green to red with red values >0 and green values <0. b* measures blue to yellow with yellow values >0 and blue values <0. The overall color change is determined by calculating Delta E, which is the geometric average of the differences in L*, a*, and b* between exposed and unexposed samples. Lower Delta E values indicate less staining of the sample.

The change in brightness values that occur during staining is also an indication of the ability of the surface to resist stain. Brightness is measured according to Tappi method T 452.

The level of adhesion of an extrusion coated material to the substrate of interest can be measured using a method described below that measures the resistance to separation as the adherent is peeled from the adherend. This method is designed for determining the adhesion strength of polymer to paper and paperboard using the Dixie® Adhesion Tester. For determining adhesion strength using the Instron, see ACC Standard Method M-726.

Apparatus:

Dixie® Adhesion Tester: The Dixie® adhesion tester separates at an angle of approximately 180° at a separation speed of 1 inch per minute (in./min).

Scotch (3M) No. 600 cellophane tape, 1-½ inch width.

Die cutter with die, razor blade cutter with a straight edge, or other means for cutting 1 inch wide specimens with exactly parallel edges.

1 in.×6 in. paper strips (approximately 105 pounds per ream (lbs./rm). basis weight).

Scotch (3M) No. 600 cellophane tape, ½ inch or 1 inch width.

Beaker, 150 or 250 milliliters (ml).

Reagents:

Methanol, methyl chloroform, toluene, and MEK (for use on polyethylene coated printed substrates).

Specimen Preparation:

If this test is made at the plant, or if it is possible to obtain samples so prepared, run a release (slip) sheet across the web through the substrate.

Condition all samples at least 24 hours at 73° F. (degrees Fahrenheit), 50% relative humidity (R.H.) prior to testing. Where facilities are available, precondition the samples at 30%-35% R.H. prior to conditioning at 50% R.H. so as to approach equilibrium moisture from the low side. Carry on all subsequent preparation and testing at 73° F., 50% R.H.

Cut at least three specimens 2 inches wide and 7 inches long, with the grain direction the long way, from throughout the sample lot so as to be as representative as possible of the lot and free from folds, wrinkles, or other blemishes. Where full web widths are available, it is recommended to take three specimens across the web; i.e., front, center, and back. If samples were obtained with a release (slip) sheet, cut the specimens starting at the "lead-in" edge of the release sheet and cutting in the machine direction so that the first ½ in. to-1 in. of specimen has the release paper and a free tab of polymer.

If samples were not available with a release sheet, attempt to start a separation by hand at one end of a specimen. Generally, a separation can be started by initiating a tear. If the separation cannot be started by hand, dip one end, to a depth of approximately ¼ inch, into methanol (in the beaker). This is generally sufficient to loosen the polymer. However, if it fails, try methyl chloroform and/or toluene. For polymer coated printed substrates, MEK will dissolve the ink and start a separation.

Apply a 1½ inch wide strip of cellophane tape to the polymer side of the specimen that is to be tested. Cut a 1 inch wide specimen from the taped area of the specimen (1 in.×7 in) including the portion with the separation initiated. Attach a 1 in.×6 in. paper strip to the polymer-tape tab with Scotch tape to form a leader.

Some specification or requests call for not backing the polymer. If this is the case, cut the specimens in 1 in.×7 in. instead of 2 in.×7 in.

Procedure:

Zero out the force gauge without a specimen in the tester. Clamp the substrate in the clamp of the tester at the end at which the separation was started. Bring the paper strip, attached to the polymer-tape tab, back over the specimen and Scotch tape the end of the paper strip to the aluminum drum. Start the tester by switching the toggle-switch "On." After ½ in. to 1 in. of "peel-back," read the force dial reading. Be certain that a reading is not taken in an area that may have had solvent wickage.

Report:

Report the average adhesion in grams/1 in. width for each of the three positions across the web (or the minimum, maximum, and average readings if full web width samples were not available). Report any other observations such as polymer tearing, and the like. Also report if the polymer was backed (with cellophane tape) or unbacked.

Example 1

All adhesion testing resulted in fiber tear adhesion, which results when the strength of the bond between the polymer and the paper substrate is stronger than the strength of the fiber-fiber bonds that hold the sheet together. When the poly/ paper adhesion is exceeds this level and the polymer is peeled away from the paper, there will be delamination of the paper, not peeling of the polymer from the paper.

Staining Tests:

The ability of coated paper to resist staining when in contact with coffee is tested by placing coffee in contact with the coated board for a time of 5 minutes using a ring system that is used in Water Cobb testing of paper sizing. Optical measurements utilizing McBeth light standards are taken before and after staining and the values recorded. Delta E values are calculated as the geometric average of the differences in L*, a*, and b*.

| Sample | Brightness | L* | a* | b* | Delta E |
|---|---|---|---|---|---|
| Cap material before staining | 80.24 | 94.13 | −1.25 | 4.48 | |
| Cap material after staining | 78.29 | 93.69 | −1.27 | 5.25 | |
| Difference | 1.95 | 0.44 | 0.03 | −0.78 | 0.90 |
| PLA w/ 5% CaCO$_3$ before staining | 80.12 | 94.10 | −1.31 | 4.54 | |
| PLA w/ 5% CaCO$_3$ after staining | 77.28 | 93.53 | −1.37 | 5.81 | |
| Difference | 2.84 | 0.57 | 0.07 | −1.26 | 1.39 |
| PLA w/ 15% CaCO$_3$ before staining | 79.99 | 94.01 | −1.28 | 4.47 | |
| PLA w/ 15% CaCO$_3$ after staining | 75.00 | 93.08 | −1.59 | 6.92 | |
| Difference | 5.00 | 0.93 | 0.31 | −2.45 | 2.64 |

The cap material shows significantly less color change with the 65.9% and 35.2% reduction in Delta E values between the 15% filled and 5% filled samples, respectively. The brightness loss measures 61% and 31.3% improvement for 15% and 5% fill levels, respectively. The resistance to staining is valuable because it provides the perception of a clean, inert surface for food contact applications.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include ±1%, ±2%, ±3%, ±4%, ±5%, ±6%, ±7%, ±8%, ±9%, or ±10%, or more of the numerical value(s) being modified. In addition, the phrase "about 'x' to 'y'" includes "about 'x' to about 'y'".

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A paper product, comprising: a paperboard comprising a substrate layer, a filler layer, and a cap layer, wherein the filler layer is disposed between the substrate layer and the cap layer, wherein: the filler layer includes about 15% weight to about 25% weight of a filler material, the cap layer includes a polylactic acid based resin, and the cap layer is substantially free of the filler material.

2. The paper product of claim 1, wherein the filler material is selected from the group consisting of: calcium carbonate, TiO$_2$, BaSO$_4$, clay, kaolin, silica, Mg-Al-silicate, styrene-based resin, acrylic resin, styrene-acrylic copolymer resin, vinyl chloride, polycarbonate, mica, sodium carbonate, potassium carbonate, barium carbonate, sodium silicate, sodium borosilicate, magnesium oxide, strontium oxide, barium oxide, a zeolite, silicon dioxide, magnesium oxide, calcium oxide, barium oxide, and combinations thereof.

3. The paper product of claim 1, wherein the filler material is calcium carbonate.

4. The paper product of claim 1, wherein the filler layer includes a polylactic acid based resin, wherein the polylactic acid based resin is about 30 to 80% weight of the filler layer.

5. The paper product of claim 4, wherein the filler layer includes a polyester material selected from the group consisting of: polycaprolactone (PCL), polyvalerolactone (PVL), poly(lactide-co-glycolide) (PLGA), polybutyrolactone (PBL), polyglycolide, polypropiolactone (PPL), poly(butylene terephthalate) (PBT), polybutylene adipate terephthalate (PBAT), poly butanediol adipic acid (PBA), and combinations thereof.

6. The paper product of claim 5, wherein the filler layer further includes about 2% to about 30% weight of the polyester material.

7. The paper product of claim 1, wherein the polylactic acid based resin is about 40 to 100% weight of the cap layer.

8. The paper product of claim 1, wherein the cap layer includes a polyester material selected from the group consisting of: polycaprolactone (PCL), polyvalerolactone (PVL), poly(lactide-co-glycolide) (PLGA), polybutyrolactone (PBL), polyglycolide, polypropiolactone (PPL), poly(butylene terephthalate) (PBT), polybutylene adipate terephthalate (PBAT), poly butanediol adipic acid (PBA), and combinations thereof.

9. The paper product of claim 1, wherein the substrate layer is made of papermaking fibers.

10. The paper product of claim 1, wherein the paper product is selected from the group consisting of: a hot cup, a food wrap, a sleeve, and a paper product having heat seal applications, wherein a portion of the cap layer is disposed on an inner surface of the paper product and contacts a food product.

11. A paper product, comprising: a paperboard comprising a substrate layer, a first filler layer, a second filler layer, a first cap layer, and a second cap layer, wherein the substrate layer is disposed between the first filler layer and the second filler layer, wherein the first filler layer is disposed between the first cap layer and the substrate layer, wherein the second filler layer is disposed between the second cap layer and the substrate layer, wherein each of the first filler layer and the second filler layer includes a filler material, wherein the first cap layer and the second cap layer includes a polylactic acid based resin, and wherein each of the first cap layer and the second cap layer is substantially free of the filler material.

12. The paper product of claim 11, wherein the filler material is selected from the group consisting of: calcium carbonate, kaolin, clay, mica, talc, and combinations thereof.

13. The paper product of claim 11, wherein at least one filler layer includes a polyester material selected from the group consisting of: polycaprolactone (PCL), polyvalerolactone (PVL), poly(lactide-co-glycolide) (PLGA), polybutyrolactone (PBL), polyglycolide, polypropiolactone (PPL), poly(butylene terephthalate) (PBT), polybutylene adipate terephthalate (PBAT), poly butanediol adipic acid (PBA), and combinations thereof.

14. The paper product of claim 13, wherein at least one filler layer further comprises a polylactic acid based resin.

15. The paper product of claim 13, wherein at least one filler layer further comprises about 30% to about 80% weight of a polylactic acid based resin.

16. The paper product of claim 15, wherein at least one filler layer comprises about 2% to about 30% weight of the polyester material.

17. The paper product of claim 16, wherein each of the first filler layer and the second filler layer comprises about 15% to about 25% weight of the filler material and about 55% to about 80% weight of the polylactic acid based resin.

18. The paper product of claim 11, wherein each of the first filler layer and the second filler layer comprises about 15% to about 25% weight of the filler material.

19. A paper product, comprising: a paperboard comprising a substrate layer, a filler layer, and a cap layer, wherein the filler layer is disposed between the substrate layer and the cap layer, wherein the filler layer includes about 15% weight to about 25% weight of a filler material, wherein the cap layer includes a polyester material selected from the group consisting of: polycaprolactone (PCL), polyvalerolactone (PVL), poly(lactide-co-glycolidede) (PLGA), polybutyrolactone (PBL), polyglycolide, polypropiolactone (PPL), poly(butylene terephthalate) (PBT), polybutylene adipate terephthalate (PBAT), poly butanediol adipic acid (PBA), polylactic acid (PLA), and combinations thereof, and wherein the cap layer is substantially free of the filler material.

20. The paper product of claim 19, wherein the filler layer further comprises a polylactic acid based resin and comprises about 2% to about 30% weight of the polyester material.

* * * * *